(12) United States Patent  
Kanzaki et al.

(10) Patent No.: US 6,489,966 B1
(45) Date of Patent: Dec. 3, 2002

(54) GRAPHIC PROCESSING DEVICE

(75) Inventors: Eisuke Kanzaki, Fujisawa; Shunichi Takagaki, Yokohama; Hiroaki Yasuda, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/050,850

(22) Filed: Jul. 6, 1998

(30) Foreign Application Priority Data

Mar. 28, 1997 (JP) ............................................. 9-076951

(51) Int. Cl.⁷ ................................................. G09G 5/00
(52) U.S. Cl. ....................................................... 345/613
(58) Field of Search ................................ 345/505, 418, 345/611–616, 619–620

(56) References Cited

U.S. PATENT DOCUMENTS 5,363,475 A * 11/1994 Baker et al. ................. 345/422
5,392,385 A * 2/1995 Evangelisti et al. ......... 345/611
5,422,991 A * 6/1995 Fowler ........................ 345/443
5,668,940 A * 9/1997 Steiner et al. ............... 345/592
6,104,842 A * 8/2000 Rich ........................... 382/304

* cited by examiner

*Primary Examiner*—Jeffery Brier
*Assistant Examiner*—Anthony J. Blackman
(74) *Attorney, Agent, or Firm*—Ronald L. Drumheller

(57) ABSTRACT

A superior graphic processing device is provided that performs parallel and fast edge function processing for coverage calculations during an anti-aliasing process. The edge function for each sub-pixel of a pixel can be described separately for the base edge function Bef concerning pixel coordinates, and the sub-edge function Sef concerning sub-pixel references, and when the sum of the values for the edge functions Bef and Sef is substituted as a variable for evaluation function LineIOcheck, whether a sub-pixel is located above, below, or on an edge line can be determined. $\Delta x \ll x$ and $\Delta y \ll y$ are established, the value of the sub-edge function Sef being considerably smaller than that of the base edge function Bef. When a plurality of relatively small Sef processing units are provided relative to one relatively large Bef processing unit, an LSI can be designed that integrates in a small area and that has the same coverage calculation capability. Further, the Bef calculation and a plurality of Sef calculations can be performed in parallel.

8 Claims, 4 Drawing Sheets

GRAPHIC PROCESSING DEVICE

BACKGROUND OF THE INVENTION

1. Field of the Invention

The present invention relates to a graphic processing device for generating a computer graphics (CG) screen on a display, such as a CRT (Cathode Ray Tube), and in particular to a graphic processing device which divides an object into multiple polygons and performs a geometric process on the polygons, and then for rasterizes pixels that constitute each polygon. More specifically, the present invention pertains to a graphic processing device for performing an anti-aliasing process to remove aliasing at the edges of polygons, and in particular to a graphic processing device for performing anti-aliasing in accordance with a percentage (i.e., a coverage) of sub-pixels, included in a pixel, that are covered by a polygon.

2. Related Art

In accordance with recent technical progression, application fields for computers have expanded. The preparation and processing of graphic forms and images using computers, i.e., computer graphics (CG), is one of examples. Recently, in accordance with improvements in the display capabilities of computers, and functional enhancements of graphic processes, "three-dimensional graphics" that generate two-dimensional images of three-dimensional objects and display them has been focused on. Three-dimensional graphics is a technique whereby an arithmetic model is employed to represent an optical phenomenon of a three-dimensional object when it is illuminated by a light source, and that performs shading of the surface of the object based on the arithmetic equation model, or that puts a pattern to a two-dimensional image to generate a graphic image that has a more realistic appearance and has three dimensions. The three-dimensional graphic techniques have become more popular for the CAD/CAM in science, engineering, manufacturing and other application fields, and in various software development fields.

The graphic processing system generally comprises a "geometry sub-system" that is regeared as a front end and a "raster sub-system" that is regarded as a back end.

The geometry sub-system is a system for performing a geometric process to determine the position of an object on a computer screen. In the geometry sub-system, generally, an object is treated as a set of multiple polygons (normally triangles), and processing is performed for each polygon. That is, geometric calculations, such as "coordinate transformation," "clipping" and "calculation relative to a light source," are performed for each vertex that defines a polygon. "Coordinate transformation" is a process for transforming the coordinates of each vertex of a provided polygon in accordance with the position of a viewpoint. "Clipping" is a process for detecting and removing a portion of a polygon that is outside the boundaries of the edge of a computer screen. "Calculation relative to a light source" is a process for acquiring the luminance of each vertex based on the positional relationship with a light source.

The raster subsystem is a system for generating pixels that constitute an object. The rasterization process is generally performed by interpolating image parameters for all pixels in the polygon, with employing an image parameter that is obtained for each vertex of a polygon. The image parameters are color data represented by RGB and a Z value representing the depth. For the latest three-dimensional graphic process, an f (fog), to express a distance, and a t (texture), to express a material or a pattern on the surface of an object to provide reality, are included as image parameters. These image parameters are also calculated for each pixel.

Almost all data in the computer engineering field are represented as digital values. Therefore, so-called aliasing, which is an undesirable phenomenon, frequently appears during the conversion of an analog phenomenon in the natural world into discontinuous digital values. In computer graphic processing, aliasing is perceived as being the zig-zag edges of a polygon, or as a graphic form that has an inaccurate shape. This phenomenon is also caused because the pixels of a display are too large or the resolution is insufficiently high in comparison with the visual acuity of a person.

The process employed for removing the aliasing phenomenon is generally called anti-aliasing. The anti-aliasing process in the computer graphic field can be performed, for example, by dividing a pixel, which is the minimum unit for a drawing process, into multiple sub-pixels and by re-evaluating image data (color data, etc.) concerning the pixel obtained during the rasterization process. In other words, in the anti-aliasing process, a pixel that is cut across by the edges of polygons is divided into 4×4, 8×8 or 16×16 sub-pixels, and the value of the color data provided for a pixel is adjusted in accordance with the percentage of sub-pixels covered by a polygon (the sub-pixels to be painted), i.e., the coverage of the sub-pixels.

In the example shown in FIG. 5, a part of a pixel is covered with a polygon having a linear edge. When the pixel is divided into 4×4 sub-pixels, the coverage is 14/16. In the example shown in FIG. 6, a part of a pixel is covered with a polygon having an arced edge. When the pixel is divided into 4×4 sub-pixels, the coverage is 14/16. In these examples, instead of determining the color data for a pixel to be discontinuous values based on whether or not a pixel is covered by a polygon, the graduation should be adjusted in accordance with the extent of the coverage of the pixel. As a result, discontinuity at the edge will be reduced and the display quality will be enhanced. A graduation substantially similar to a natural phenomenon may be added to the edges of the polygon by performing anti-aliasing. For example, a three-dimensional wire frame model generated by CAD can be drawn as a continuous smooth line with no zig-zags. In addition, an image can be drawn for which there is less smearing of color at the edge of a polygon.

For the coverage calculations for acquiring the percentage of sub-pixels covered, whether the sub-pixels of a pixel are positioned inside a polygon, along an edge line, or outside the polygon must be determined. In other words, for the coverage calculation, a processing function (edge function) must be performed to determine the position of each sub-pixel, either above, below or on an edge line that defines the boundary of a polygon.

It would be easily understood by one having ordinary skill in the art that the edge function is represented by geometric calculation expressions that include several terms. Since the edge function processing is conventionally performed by software, fast calculation is difficult. It is preferable for fast anti-aliasing that a specific hardware circuit (e.g., an LSI) be used and that parallel processing be performed. However, the edge function processing involves multiple multiplications and divisions, and a relatively large gate size is required for implementing the hardware that performs such calculation (well known). Therefore, the size of the LSI chip would become larger and accordingly, the manufacturing costs would increase.

SUMMARY OF THE INVENTION

It is, therefore, one object of the present invention to provide a superior graphic processing device to perform an anti-aliasing process for removing aliasing that occurs at the edges of polygons.

It is another object of the present invention to provide a superior graphic processing device that performs anti-aliasing in accordance with a percentage (coverage) of the sub-pixels, included in a pixel, that are covered by a polygon.

It is an additional object of the present invention to provide a superior graphic processing device that performs parallel and rapid processing to acquire a coverage required for an anti-aliasing process.

It is a further object of the present invention to provide a superior graphic processing device on which an LSI having a relatively small gate size can be implemented to acquire the coverage required for anti-aliasing.

To achieve the above objects, according to a first aspect of the present invention, a graphic processing device that has a function for calculating a coverage that indicates the percentage of a pixel to be painted, includes: means for providing information relating to an edge line that defines the border between a portion to be painted and a portion not to be painted; a first processing unit for processing an edge function with regard to a pixel coordinate; more than one second processing unit for processing an edge function with regard to a sub-pixel reference for the respective sub-pixels within the pixel; evaluation means for determining, in accordance with output of the first and second processing units, whether the sub-pixel is located above, below, or on the edge line; and coverage calculating means for calculating a coverage for the pixel based on the resultant values of the evaluation means with regard to the respective sub-pixels.

According to a second aspect of the present invention, a graphic processing device that has a function for adjusting a pixel graduation according to a coverage that indicates the percentage of a pixel to be painted, includes: means for providing information relating to an edge line that defines a border between a portion to be painted and a portion not to be painted; means for determining image information for the portion to be painted; a first processing unit for processing an edge function with regard to a pixel coordinate; more than one second processing unit for processing an edge function with regard to a sub-pixel reference for the respective sub-pixels within the pixel; evaluation means for determining, in accordance with output of the first and second processing units, whether the sub-pixel is located above, below, or on the edge line; coverage calculating means for calculating a coverage for the pixel based on the resultant values of the evaluation means performed with regard to the respective sub-pixels; and means for adjusting image information of the pixel according to the obtained coverage.

The second processing unit can be mounted outside the first processing unit.

According to a third aspect of the present invention, a coverage calculating unit that calculates a coverage that indicates the percentage of a pixel within a predetermined area, includes: a first processing unit for receiving coordinate data that defines an edge line of the predetermined area and coordinate data of a pixel, for acquiring an edge function that defines the edge line and outputting a coefficient for the edge function, and for processing the edge function of the pixel and outputting the result; more than one second processing unit for receiving the coefficient of the edge function that defines the edge line, and a sub-pixel reference of the respective sub-pixels within the pixel, and for calculating an edge function of the corresponding sub-pixel and outputting the result; and a determination unit for, by employing a result of the edge function obtained through the first processing unit and the result of the edge function obtained through the respective second processing units, determining whether the sub-pixel is inside or outside the predetermined area.

According to a fourth aspect of the present invention, a coverage calculating unit that calculates a coverage that indicates the percentage of a pixel within a predetermined area, comprises: a first processing unit for receiving coordinate data that defines an edge line of the predetermined area and coordinate data of a pixel, for acquiring an edge function that defines the edge line and outputting a coefficient for the edge function, and for processing the edge function of the pixel and outputting the result; more than one second processing unit for receiving the coefficient of the edge function that defines the edge line, and a sub-pixel reference of the respective sub-pixels within the pixel, and for calculating an edge function of the corresponding sub-pixel and outputting the result; a determination unit for, by employing a result for the edge function obtained through the first processing unit and a result for the edge function obtained through the second processing unit, determining whether the sub-pixel is inside or outside the predetermined area; and a coverage calculating unit for collecting results for all sub-pixels within the pixel and calculating a coverage of the pixel.

The second processing unit can be mounted outside the first processing unit.

The basic principle of the present invention will now be explained in detail.

An equation (i.e., edge function: ef) for a line (edge) that connects two vertexes, $V_0$ ($x_0$, $y_0$) and $V_1$ ($x_1$, $y_1$), of a polygon is expressed as equation (1) below. In equation (1), $d_x = x_1 - x_0$ and $d_y = y_1 - y_0$.

$$ef = (y - y_0)dx - (x - x_0)dy \qquad \text{[Equation 1]}$$

Assume that a point slightly apart from an arbitrary point (x, y) on the line (edge) is (x+Δx, y+Δy). When the coordinates at this point are substituted into equation (1), the edge function is represented as equation (2).

$$ef = (y - y_0)dx - (x - x_0)dx + \Delta y dx - \Delta x dy \qquad \text{[Equation 2]}$$

Assuming that point (x, y) is pixel coordinates, (x+Δx, y+Δy) can be sub-pixel coordinates and (Δx, Δy) can be a sub-pixel reference values. In many cases, each sub-pixel reference is integer times a constant value.

When the edge function for sub-pixel coordinates (x+Δx, y+Δy), expressed by equation (2), is divided into the base edge function Bef, concerning pixel coordinates (x, y), and the sub-edge function Sef, concerning sub-pixel reference (Δx, Δy), they are described as equations (3) and (4) below.

$$Bef = (y - y_0)dx + (x_0 - x)dy \qquad \text{[Equation 3]}$$

$$Sef - \Delta y dx - \Delta x dy \qquad \text{[Equation 4]}$$

When the sum of the values of the edge functions Bef and Sef is substituted into the above equations as a variable of evaluation function LineIOcheck, a lineIO information for a sub-pixel (whether a sub-pixel is located above, below, or on an edge) can be determined (see equation (5)).

$$IO = \text{LineIOcheck}(Bef + Sef) \quad \text{[Equation 5]}$$

Generally, sub-pixel references $\Delta x$ and $\Delta y$ are considerably smaller than pixel coordinates x and y, and $\Delta x \ll x$ and $\Delta y \ll y$ are established. Accordingly, the sub-edge function Sef is considerably smaller than the base edge function Bef.

In the computer engineering field, a small data value can be represented by a narrow bit width, so that the gate size of an LSI which implements the process for a small data value is small. A Bef processing unit that must process a relatively large coordinate value must also be relatively large. For example, a graphics workstation display has a resolution of about $4096=2^{13} \times 4096$ ($=2^{13}$), and x and y coordinates for addressing a pixel require an 18-bit width, 13 bits for an integer portion and 5 bits for a decimal fraction portion. Since the Bef processing unit receives and processes the x and y coordinates that each have an 18-bit width, a large processing unit is required. On the other hand, sub-pixel references $\Delta x$ and $\Delta y$ correspond only to the decimal fraction portion of the pixel coordinates for x and y, so that only a three-bit width is sufficient for 8×8 sub-pixels. That is, since the Sef processing unit processes only three-bit sub-pixel references $\Delta x$ and $\Delta y$, only a small processing unit is required.

While the Bef processing is performed once for one pixel, the Sef processing must be performed for each of the sub-pixels within a pixel. In addition, taking the sizes of the processing units into consideration, it is very probable according to an packaging technique that a single Bef processing unit and a plurality of Sef processing units can be provided on a single LSI chip.

As previously described, in the coverage calculation, the processing (Bef processing) for the coordinates of one pixel is accompanied by the processing (Sef processing) for 4×4, 8×8 or 16×16 sub-pixel references. When the edge function is divided into the base edge function portion Bef, concerning the pixel coordinates, and the sub-edge function portion Sef, concerning the sub-pixel reference, and when a plurality of Sef processing units are provided for one Bef processing unit, a high efficiency for the mounting of a single LSI chip can be performed and the implementation of the equivalent coverage calculation capability requires only a small area, so that manufacturing costs can be reduced. Further, since the Bef calculation for a pixel and a plurality of Sef calculations for sub-pixels, which accompanies the Bef calculation, are performed in parallel, the processing speed can be increased.

While in the above description it has been assumed that the edge function was for a linear edge of a polygon, the edge function for an arced edge will be described.

Assume that the edge of a polygon is composed of an arc with a center $V_c$ ($x_c$, $y_c$) and a diameter d. The equation (edge function: cef) for the arc is thus represented as equation (6).

$$Cef = \left(\frac{d}{2}\right)^2 - \{(x - x_c)^2 + (y - y_c)^2\} \quad \text{[Equation 6]}$$

Assume that a point slightly apart from an arbitrary point (x, y) on the arc (edge) is (x+$\Delta x$, y+$\Delta y$). When the coordinates at this point are substituted into equation (6), the edge function is represented as equation (7). It should be noted that $x - X_c = d_x$ and $y - y_c = d_y$.

$$Cef = \left(\frac{d}{2}\right)^2 - (dx^2 + dy^2) - \{2(dx\Delta x + dy\Delta y) + \Delta x^2 + \Delta y^2\} \quad \text{[Equation 7]}$$

Assuming that point (x, y) is pixel coordinates, (x+$\Delta x$, y+$\Delta y$) can be sub-pixel coordinates and ($\Delta x$, $\Delta y$) can be a sub-pixel reference values, as previously described. In many cases, each sub-pixel reference is integer times a constant value.

When the edge function for sub-pixel coordinates expressed by equation (7) is divided into the base edge function Bef, concerning pixel coordinates (x, y), and the sub-edge function Sef, concerning sub-pixel reference ($\Delta x$, $\Delta y$), they are described as equations (8) and (9) below.

$$Bef = \left(\frac{d}{2}\right)^2 - (dx^2 + dy^2) \quad \text{[Equation 8]}$$

$$Sef = -\{2(dx\Delta x + dy\Delta y) + \Delta x^2 + \Delta y^2\} \quad \text{[Equation 9]}$$

When the sum of the values of the edge functions Bef and Sef is substituted as a variable of evaluation function CircleIOcheck into the above equations, a circleIO information for a sub-pixel (whether a sub-pixel is located above, below, or on an edge) can be determined (see equation (10)).

$$IO = \text{CircleIOcheck}(Bef + Sef) \quad \text{[Equation 10]}$$

Generally, sub-pixel references $\Delta x$ and $\Delta y$ are considerably smaller than pixel coordinates x and y, and $\Delta x \ll x$ and $\Delta y \ll y$ are established. Accordingly, the sub-edge function Sef is considerably smaller than the base edge function Bef (described above).

In the computer engineering field, a small data value can be represented using a narrow bit width, so that the gate size of an LSI to be implemented for processing a small data value is small. A Bef processing unit that processes a relatively large coordinate value must be relatively large. On the other hand, as the required Sef processing unit is small, a plurality of Sef processing units can be provided for one Bef processing unit (as described above).

As previously described, in the coverage calculation, the processing (Bef processing) for the coordinates for one pixel is accompanied by the processing (Sef processing) of 4×4, 8×8 or 16×16 sub-pixel references. When the edge function is divided into the base edge function portion Bef, concerning the pixel coordinates, and the sub-edge function portion Sef, concerning the sub-pixel reference, and when a plurality of Sef processing units are provided for one Bef processing unit, an LSI chip having a small area can be designed that has the same coverage calculation capability and a high mounting efficiency, resulting in the reduction of manufacturing costs. Further, since the Bef calculation for a pixel and the Sef calculations for a plurality of sub-pixels, which accompany the Bef calculation, are performed in parallel, the processing speed can be increased.

For the LSI design, it is well known that a small gate size for a computer, i.e., a small mounting area, directly affects the reduction of manufacturing costs. According to the present invention, since a unit for coverage calculation during graphic processing (particularly during a rasterization process) occupies only a small mounting area, the manufacturing costs can be greatly reduced.

In short, according to the present invention, provided is a superior graphic processing device that performs parallel, rapid edge function processing for coverage calculation during an anti-aliasing process.

In addition, according to the present invention, provided is a superior graphic processing device on which can be mounted an LSI having a relatively small gate size that performs coverage calculation for anti-aliasing.

The other objects, features, and advantages of the present invention will become apparent during the course of the detailed description of the embodiment of the present invention, which will be given while referring to the accompanying drawings.

DESCRIPTION OF THE PREFERRED EMBODIMENT

One embodiment of the present invention will now be described in detail while referring to the accompanying drawings.

Figure 1:
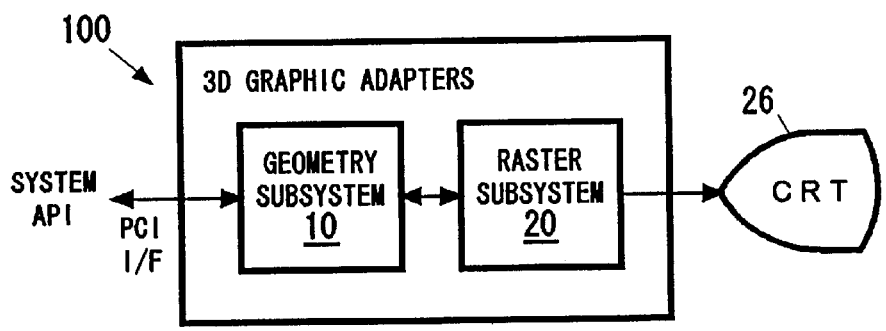
FIG. 1 is a specific diagram illustrating the hardware arrangement of a graphic processing system 100 according to the present invention.
Figure 5:
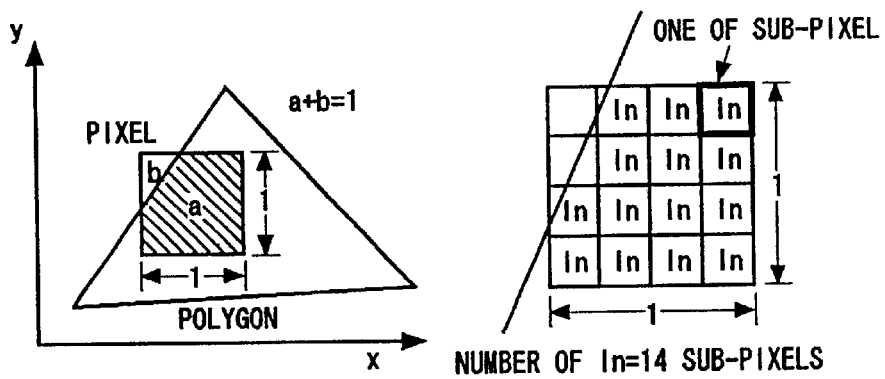
FIG. 5 is a schematic diagram showing where a pixel that is partially covered by a polygon having linear edges, and showing the condition where such a pixel is divided into 4×4 sub-pixels and their coverage is calculated.
Figure 6:
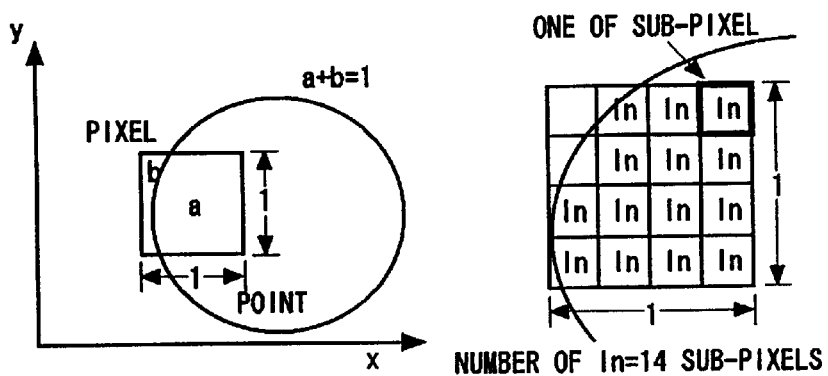
FIG. 6 is a schematic diagram showing a pixel that is partially covered by a polygon having arced edge, and showing the condition where such a pixel is divided into 4×4 sub-pixels and their coverage is calculated.

FIG. 1 is a specific diagram illustrating the hardware arrangement of a graphic processing system 100 according to the present invention. The system 100 comprises a geometry subsystem 10 that is regarded as a front end and a raster subsystem 20 that is regarded as a back end. The graphic processing system 100 is employed, for example, as an expansion adaptor card for an external host computer system (not shown). One example host computer system is workstation "RS/6000" sold by IBM Japan, Ltd. The workstation, in general, includes at least one bus slots into which an expansion adaptor card is inserted, and can also accept the graphic processing system 100. A specific example of a bus interface standard is PCI (Peripheral Component Interconnect).

The host computer system divides a three-dimensional object into multiple polygons (normally triangles), calculates three-dimensional coordinate data and other image information for each vertex of a polygon in advance, and manages the obtained data for each polygon in a storage device (e.g., a hard disk: not shown) in the system. The host computer system sequentially supplies a data set (or an image command string) of the stored image information to the graphic processing system 100. One data set generally comprises a set of image information for defining one polygon (or a part of a polygon), and includes coordinate data for each vertex of a polygon, a line width, a line type and an identifier for a texture to be attached to the polygon.

The geometry subsystem 10 performs geometric processing for a data set received from the host computer system. The geometric processing includes "coordinate transformation," "clipping" and "light source calculation." The geometry subsystem 10 generally includes a plurality of node processors (not shown) and performs parallel processing by data sets.

The raster subsystem 20 paints pixels in a polygon defined by a data set. The rasterization process is performed, based on the image parameters obtained from the geometric processing, for each vertex of a polygon in order to interpolate image parameters for all the pixels in a polygon.

Figure 2:
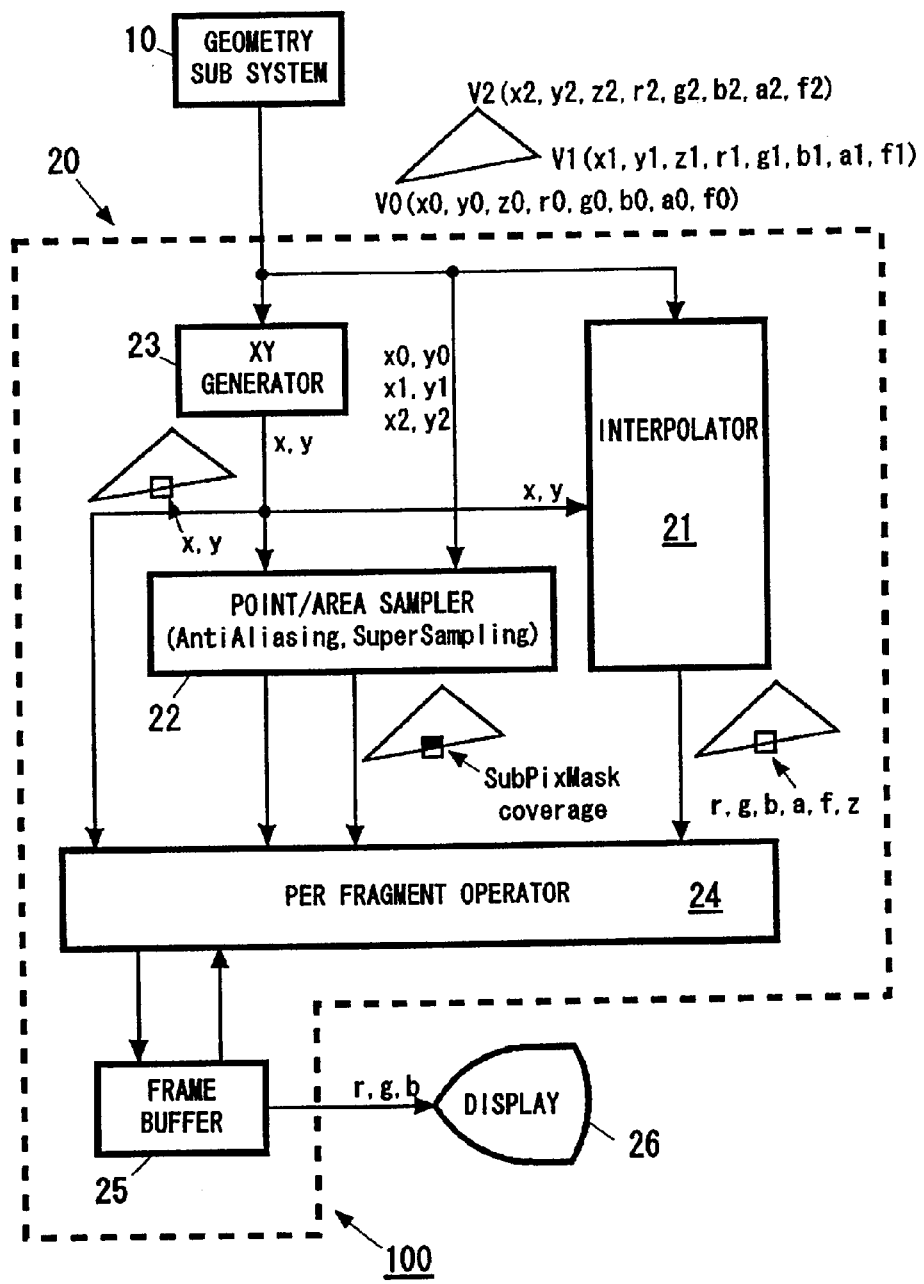
FIG. 2 is a diagram illustrating the structure of a raster subsystem 20.

FIG. 2 is a diagram illustrating the internal structure of the raster subsystem 20. As is shown in FIG. 2, the raster subsystem 20 comprises an interpolator 21, a point/area sampler 22, an XY coordinate generator 23, a per fragment operator 24 and a frame buffer 25.

The interpolator 21 is a unit for interpolating image data for pixels in a polygon. The interpolator 21 receives, from the geometry subsystem 10, coordinate data (x, y, z) for each vertex of a polygon and image data (r, g, b, a, f, . . . ), interpolates the image data for each pixel in a polygon, and transmits the obtained pixel data to the per fragment operator 24. The interpolator 21 generally includes a plurality of node processors (not shown) and performs parallel processing for each pixel. Since the interpolation process is not directly related to the subject of the present invention, no further explanation for it will be given.

The XY coordinate generator 23 generates coordinate data for each pixel included in a polygon. The XY coordinate generator 23 receives from the geometry subsystem 10 coordinate data for each vertex that defines a polygon, and generates the coordinate data for each pixel in a polygon and sequentially transmits them to the point/area sampler 22.

The point/area sampler 22 calculates parameters, such as coverage and sub-pixel mask information. The point/area sampler 22 receives from the geometry subsystem 10 coordinate data for each vertex that defines a polygon, and also receives from the XY coordinate generator 23 coordinate data for each pixel of a polygon. The parameters, such as coverage and sub-pixel mask information, are employed by the per fragment operator 24 to evaluate (perform anti-aliasing for) image data concerning pixels for color data. As previously described, the coverage is the percentage of the pixel area included in a polygon, and in this embodiment, the coverage is described as the percentage of sub-pixels in a pixel. The sub-pixel mask information is information indicating whether an arbitrary sub-pixel of a pixel is located inside or outside a polygon. Since the application for the sub-pixel mask information is not directly related to the subject of the present invention, no further explanation for it will be given.

The per fragment operator 24 receives interpolation data (r, g, b, a, f, z, . . . ) for each pixel that is acquired by the interpolator 21, and evaluates (i.e. performs anti-aliasing for) color data for a pixel in accordance with the coverage and the sub-pixel mask information obtained by the point/area sampler 22.

The image data for a pixel adjusted by the per fragment operator 24 is temporarily written at a corresponding address in the frame buffer 25. Then, according to color data (r, g, b) that is read from the frame buffer 25, the object is drawn on a display screen 26.

Figure 3:
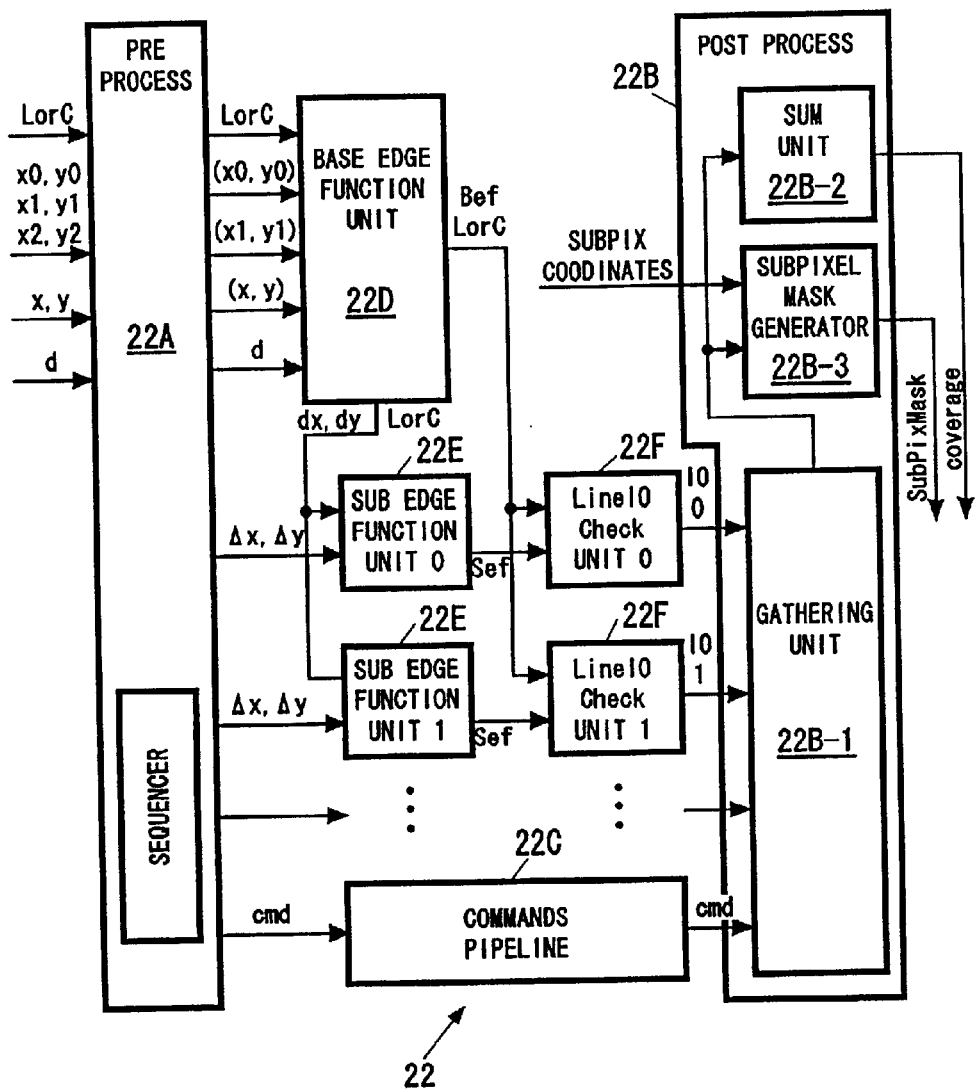
FIG. 3 is a diagram illustrating the structure of a point/area sampler 22.

FIG. 3 is a diagram illustrating the internal structure of the point/area sampler 22. As is shown in FIG. 3, the point/area sampler 22 comprises a pre-process unit 22A, a post process unit 22B, a commands pipeline 22C for performing pipeline processing for image commands, a base edge function (Bef) unit 22D, a plurality of sub edge function (Sef) units 22E, and lineIO check units 22F.

The pre-process unit 22A receives information concerning a border (edge line) of a polygon, and supplies necessary data to the Bef unit 22D and the Sef units 22E. The information concerning the edge line includes, for example, coordinate data for each vertex of a polygon (($x_0$, $y_0$), ($x_1$, $y_1$), ($x_2$, $y_2$)), coordinate data for a pixel that is currently being processed, data indicating whether an edge is linear or arced (LorC), and a diameter d if the edge is arced.

Of the edge function ef (equation (1) or (6)) expressing the lineIO information for a sub-pixel in a pixel (i.e., whether a sub-pixel is located above, below, or on a line), the edge function for portion Bef (equation (3) or (8)), concerning pixel coordinates (x, y), is performed by the Bef unit 22D, and the edge function for portion Sef (equation (4) or (9)), concerning sub-pixel reference ($\Delta x$, $\Delta y$), is performed by the respective Sef units 22E.

The Bef unit 22D receives coordinate data (e.g., ($x_0$, $y_0$) and ($x_1$, $y_1$)) for two points on the edge, and data, such as LorC and d, that are required for processing the edge function, and processes portion Bef of the edge function. The Bef unit 22D outputs the results to the lineIO check units 22F and supplies coefficient portions $d_x$ and $d_y$ for the edge function and attribute LorC for the edge line to the Sef units 22E. As is previously described, each of the coordinate values x and y for addressing a pixel requires an 18-bit width, 13 bits for an integer portion and 5 bits for a decimal fraction portion. Accordingly, the Bef unit 22D for processing input data having a huge bit width is large.

Each Sef unit 22E receives coefficient portions $d_x$ and $d_y$ for the edge function, and reference ($\Delta x$, $\Delta y$) for a sub-pixel in a pixel, processes the Sef portion of the edge function, and outputs the result to the corresponding lineIO check unit 22F.

Sub-pixel references $\Delta x$ and $\Delta y$ correspond only to decimal fraction portions of pixel coordinates x and y, and require only a three-bit width each. The Sef units 22E that need only to process the sub-pixel references $\Delta x$ and $\Delta y$ are designed to be small. While the Bef processing is required only once for one pixel, Sef processing is repeated the equivalent of the sub-pixel count in a pixel. When one pixel is divided into 4×4, 8×8 or 16×16 sub-pixels, the Sef processing is repeated 4×4, 8×8 or 16×16 times to acquire a coverage. Taking into consideration the fact that a single Sef unit 22E can be mounted in a smaller area than is required for the Bef unit, as is shown in FIG. 3, while a single Bef unit 22D is provided, multiple Sef units 22E can be provided. Further, the complete Bef processing and the Sef processing that includes multiple but single calculations can be performed in parallel.

The lineIO check units 22F are arranged in correspondence with the Sef units 22E. The lineIO check units 22F can determine the lineIO information for a sub-pixel (whether a sub-pixel is located above, below, or on an edge line) by processing function "LineIOcheck" (or "CircleIOcheck"). As is expressed in equation (5) or (10), the LineIOcheck/ CircleIOcheck parameter is divided into the Bef portion concerning the pixel coordinates, and the Sef portion concerning the sub-pixel reference, which are supplied by the Bef unit 22D and a corresponding Sef unit 22E. When the Sef units 22E and the lineIO check units 22F are arranged in a number equivalent to the sub-pixel count, lineIO information concerning sub-pixels can be obtained in parallel and the processing time reduced.

The post process unit 22B collects and processes the lineIO information for sub-pixels to acquire pixel coverage and sub-pixel mask information. For example, the results obtained by the lineIO check units 22F are transmitted to a gathering unit 22B-1, the number of sub-pixels located above (or below) the edge line is counted by a sum unit 22B-2, and the percentage of sub-pixels relative to a pixel is output as a coverage value. A sub-pixel mask generator 22B-3 receives coordinates for an arbitrary sub-pixel, and acquires lineIO information for that sub-pixel and outputs it as mask information.

Figure 4:
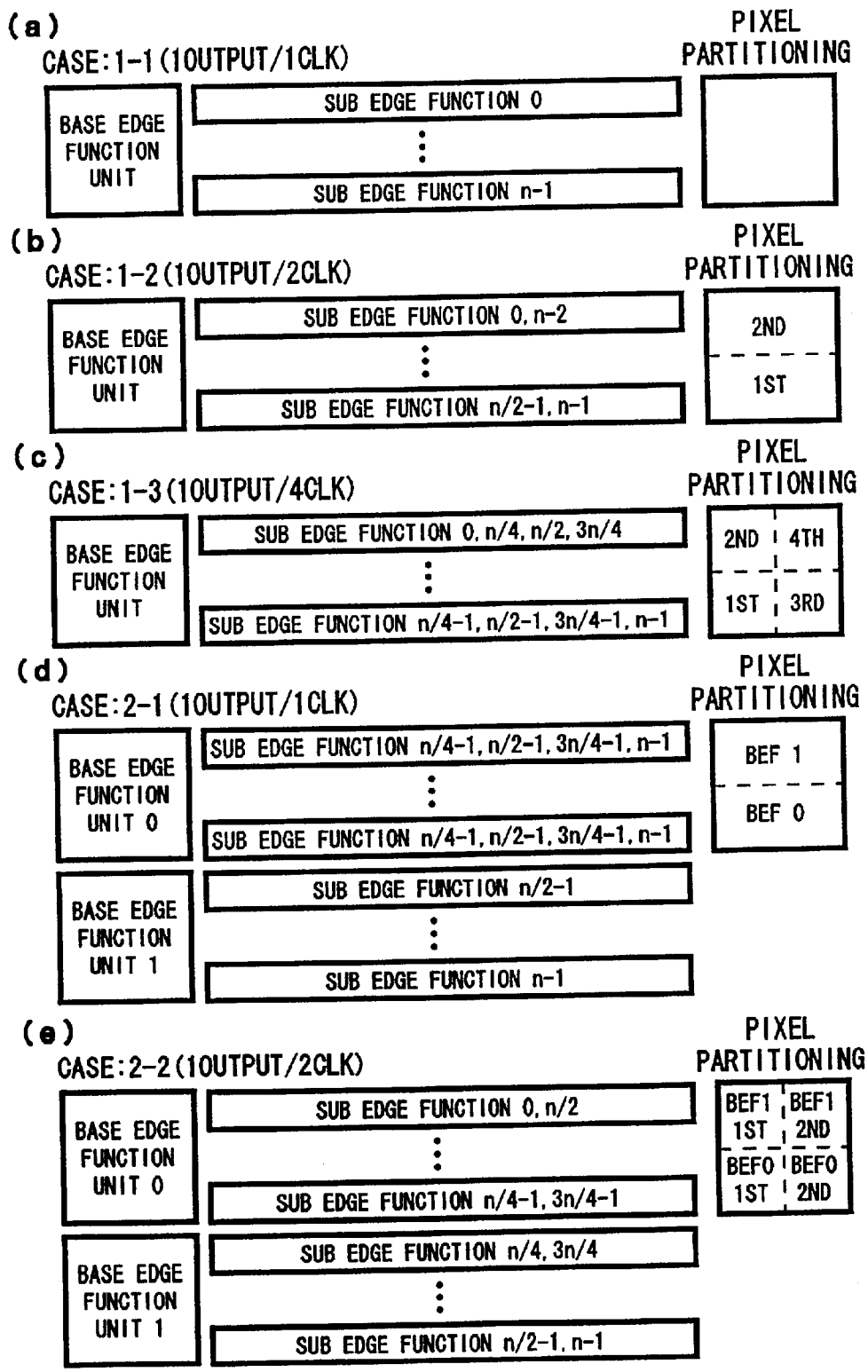
FIGS. 4(a) through 4(e) are diagrams illustrating other example structures for a Bef unit 22D and Sef units 22E in the point/area sampler 22.

In the point/area sampler 22 in FIG. 3 where the Bef unit 22D and the Sef units 22E are arranged, the Sef units 22E are preferably provided in a number equivalent to the sub-pixel count in a pixel. The Sef units are not limited to this arrangement, however. Other structures for the Bef unit 22D and the Sef units 22E are shown in FIGS. 4(a) through (e). In FIG. 4(a), Sef units are provided in a number equivalent to the sub-pixel total; and in FIG. 4(b), Sef units are provided in a number equivalent to half of the sub-pixel total, and acquire lineIO information for all the sub-pixels in a time sharing manner. In the arrangement in FIG. 4(c), the Sef units are arranged the equivalent of one quarter of the sub-pixel total, and acquire lineIO information for all the sub-pixels in a time sharing manner. Although the mounting area for the graphic processing system is reduced by decreasing the number of Sef units, the processing speed is accordingly slowed. Which arrangement should be adopted depends on the design of a circuit.

In FIGS. 4(d) and 4(e), two Bef units are prepared to perform parallel coverage calculation for two pixels. Although the processing speed is increased, the occupied area by the graphic processing system is increased, and accordingly, manufacturing costs rises. Which of the arrangements should be adopted depends on the design of a circuit.

The present invention has been described in detail while referring to a specific embodiment. However, it should be obvious to one having ordinary skill in the art that various modifications or revisions of the embodiment are possible within the scope of the present invention. Although, in this specification, the pixel coverage calculation has been explained by specifying anti-aliasing in the computer graphic processing, it would be easy for one having ordinary skill in the art who understands the disclosed embodiment to apply the coverage calculation for another application field. That is, although the present invention has been disclosed by using an example, it should not be limited to that example. To fully understand the subject of the present invention, the preceding claims should be referred to.

As is described above in detail, according to the present invention, provided is a superior graphic processing device that performs parallel, rapid processing for coverage calculation during an anti-aliasing process.

In addition, according to the present invention, provided is a superior graphic processing device on which can be packaged in a single LSI chip having a relatively small gate size that performs coverage calculation for anti-aliasing. According to the present invention, since a unit for coverage calculation during graphic processing (particularly during a rasterization process) occupies only a small packaging area, the manufacturing costs can be greatly reduced.

What is claimed is:

1. A graphic processing device that has a function for calculating a percentage of a pixel that is covered by an area to be painted, including:

means for providing information relating to an edge line that defines a border between an area to be painted and an area not to be painted;

a first processing unit for processing a base edge function with regard to a pixel coordinate;

more than one second processing unit for parallel processing a sub-edge function with regard to sub-pixel references for respective sub-pixels within the pixel, a sub-pixel reference being a relative coordinate position of a sub-pixel with respect to the pixel coordinate;

evaluation means for determining, in accordance with outputs of said first and second processing units, whether respective sub-pixels are located above, below, or on the edge line; and coverage calculating means for calculating a coverage for the pixel based on resultant values of said evaluation means with regard to the respective sub-pixels.

2. The graphic processing device according to claim 1, wherein said second processing unit is mounted outside said first processing unit.

3. A graphic processing device that has a function for adjusting a pixel graduation according to a percentage of a pixel that is covered by an area to be painted, including:

means for providing information relating to an edge line that defines a border between a portion to be painted and a portion not to be painted;

means for determining image information for the portion to be painted;

a first processing unit for processing a base edge function with regard to a pixel coordinate;

more than one second processing unit for parallel processing a sub-edge function with regard to sub-pixel references for respective sub-pixels within the pixel, a sub-pixel reference being a relative coordinate position of a sub-pixel with respect to the pixel coordinate;

evaluation means for determining, in accordance with outputs of said first and second processing units, whether respective sub-pixels are located above, below, or on the edge line;

coverage calculating means for calculating a coverage for the pixel based on resultant values of said evaluation means performed with regard to the respective sub-pixels; and means for adjusting image information of the pixel according to the calculated coverage.

4. The graphic processing device according to claim 3, wherein said second processing unit is mounted outside said first processing unit.

5. A coverage calculating unit that calculates a coverage that indicates the percentage of a pixel that lies within a predetermined area, including:

a first processing unit for receiving coordinate data that defines an edge line of the predetermined area and coordinate data of a pixel, for acquiring an edge function that defines the edge line and outputting a coefficient for the edge function, and for processing the edge function of the pixel and outputting a result;

more than one second processing unit for receiving the coefficient of the edge function that defines the edge line, and sub-pixel references of respective sub-pixels within the pixel, a sub-pixel reference being a relative coordinate position of a sub-pixel with respect to a coordinate position of the pixel indicated by the coordinate data, and for parallel calculating a sub-edge function of respective sub-pixels and outputting the result; and a determination unit for, by employing a result of the edge function obtained through said first processing unit and the result of the sub-edge function obtained through the respective second processing units, determining whether the respective sub-pixels are inside or outside the predetermined area.

6. The coverage calculating unit according to claim 5, wherein said second processing unit is mounted outside said first processing unit.

7. A coverage calculating unit that calculates a coverage that indicates the percentage of a pixel that lies within a predetermined area, comprising:

a first processing unit for receiving coordinate data that defines an edge line of the predetermined area and coordinate data of a pixel, for acquiring an edge function that defines the edge line and outputting a coefficient for the edge function, and for processing the edge function of the pixel and outputting a result;

more than one second processing unit for receiving the coefficient of the edge function that defines the edge line, and sub-pixel references of respective sub-pixels within the pixel, a sub-pixel reference being a relative coordinate position of a sub-pixel with respect to a coordinate position of the pixel, and for parallel calculating a sub-edge function of respective sub-pixels and outputting the result;

a determination unit for, by employing a result for the edge function obtained through said first processing unit and a result for the sub-edge function obtained through said more than one second processing unit, determining whether the respective sub-pixels are inside or outside the predetermined area; and a coverage calculating unit for collecting results for all sub-pixels within the pixel and calculating a coverage of the pixel.

8. The coverage calculating unit according to claim 7, wherein said second processing unit is mounted outside said first processing unit.

* * * * *